United States Patent [19]

Powondra

[11] 4,431,348
[45] Feb. 14, 1984

[54] FORCE TRANSMISSION DEVICE

[76] Inventor: Franz Powondra, Beethovengasse 4, A-1090 Vienna, Austria

[21] Appl. No.: 288,515

[22] Filed: Jul. 30, 1981

[30] Foreign Application Priority Data

Jul. 31, 1980 [AT] Austria ............................. 3970/80

[51] Int. Cl.³ ..................... E21D 20/00; E21D 21/00
[52] U.S. Cl. ............................. 405/259; 403/DIG. 8; 411/411
[58] Field of Search ............................. 405/259–261, 405/244, 262; 403/DIG. 8, 328, 374; 411/411

[56] References Cited

FOREIGN PATENT DOCUMENTS

| 2330801 | 1/1974 | Fed. Rep. of Germany . | |
| 2425524 | 11/1975 | Fed. Rep. of Germany . | |
| 2751020 | 5/1978 | Fed. Rep. of Germany | 405/259 |
| 1199030 | 10/1959 | France | 405/259 |
| 448165 | 5/1949 | Italy | 411/411 |
| 651556 | 4/1951 | United Kingdom . | |
| 707514 | 4/1954 | United Kingdom . | |
| 932149 | 7/1963 | United Kingdom | 403/DIG. 8 |

Primary Examiner—Dennis L. Taylor
Attorney, Agent, or Firm—Fleit, Jacobson, Cohn & Price

[57] ABSTRACT

Force transmission device suitable for the performance of deformation work comprising a bush having a tapering interior, including a particulate filling material in the form of spheres and/or a granulate and a ribbed rod passing through the bush, the particulate filling material being present in at least two different sizes and the larger sized bodies of the filling material being essentially accommodated at the converging end of the interior, at least some of the bodies of the filling material being larger than the magnitude by which the ribs of the rod project.

10 Claims, 2 Drawing Figures

FORCE TRANSMISSION DEVICE

Force transmission device comprising a sleeve having a converging interior through which passes a rib rod, the space between the rod and the sleeve being filled with particulate material of different sizes, the larger bodies being accommodated at the converging end of the interior, individual bodies of the filling material being larger than the raised regions of the rod.

BACKGROUND OF THE INVENTION

The invention relates to a force transmission device, in the following often referred to simply as a device, which is suitable for performing deformation work, comprising a bush having a converging interior, including a particulate filling material in the form of spheres and/or a granulate and a ribbed rod passing through the bush.

In many cases it is desirable for load bearing constructions to possess substantial yieldability whilst retaining their load-bearing capacity. For example, in the context of tunnels, earth moving and mining works, load-bearing constructions are desired which are capable of moving with the deformations of the country rock or earth strata without fracturing. Anchor bolts for example are so designed that the country rock on the excavation side bears against yieldable constructions. The desired yieldability may be attained for example by a connecting member on the tie bolt which slides along the latter under the influence of the rock load, or for example by the provision of a crushing member between the country rock and a fixed point on the tie bolt. Such anchor bolts may be nontensioned or pretensioned.

In the context of tunnelling and mining it has furthermore been proposed to use tubbing constructions of steel or steel-reinforced concrete equipped with crushing zones between the tubbings in order to increase the deformation capacity of the rock support. As the country rock converges into the excavation area, the crushing zones between the tubbings become compressed. Analogously other forms of rock support such as arches, props and the like may be fitted with crushing zone constructions in order to retain their support effect even in the case of country rock deformations.

The aforesaid yielding constructions are employed in mining and tunnelling for protection against chipping off of rock particles and rock pressure bursts. The kinetic energy of the chipping or rock burst action is thus to be converted into deformation energy which by being absorbed in the yielding construction is rendered harmless. The same purpose—the conversion of kinetic energy into deformation energy—is aimed at by yielding means used in transport engineering, e.g. in the form of yielding supports for passengers in vehicles, of crushing zones in vehicles or in the form of catching constructions for vehicles such as for example guide rails, catching nets and buffer blocks having predesigned yielding properties. Similar yielding constructions are employed for protection against avalanches, rock falls and other falling or flying objects.

In order to attain the desired yieldability, anchor heads became known in the context of anchor bolts which by virtue of the country rock pressure slide along a tie bolt. In this case the tie bolt and the anchor head are interengaging bodies, defining a converging space therebetween. The latter accommodates a particulate filling material which is subjected to pressure in the direction of convergence of the intermediate space. Once the tie bolt is moved in relation to the anchor head in the direction of convergence of the intermediate space, the particulate filling material, e.g. spheres, is pressed into the material of the tie bolt or of the anchor head and of the tie bolt. Sliding is thus possible only by the application of force. The described construction comprising an anchor head and a rod acts as a force transmission device in which forces are transmitted preferably in the longitudinal direction of the rod and in which deformation work is done during relative movements between the anchor head and the rod.

The above described force transmission device in the case of anchor bolts as well as other uses of the above-mentioned types of yielding constructions is subjected to technical demands depending on the particular application purpose. These demands relate to movement performance under load by the force transmission device, its reliability, its mode of assembly, its corrosion properties, its protection against adverse external effects and the economics of its manufacture.

In order to comply with such particular demands, special designs of the force transmission device are necessary.

For example, it may be required that the transmissible forces of a not pretensioned force transmission device should rise steeply during the initial movements within the device and that major distances of movement, e.g. of 40 cm are attained when large forces are transmitted without fracturing in the force transmission device. Such demands are for example imposed on the force transmission device when it is used for roof bolting where a high degree of yieldability is desired and where the carrying capacity in the initial rock deformation stages should increase steeply.

SUMMARY OF THE INVENTION

It is an object of the invention to provide a force transmission device which complies with the above requirements.

This is attained according to the invention with a force transmission device as set out in the introduction in that the particulate filling material is present in at least two different sizes and that the larger bodies of the filling material are essentially accommodated at the converging end of the interior, at least some of the bodies of the filling material being larger than the amount by which the ribs of the rod project.

The expression rod is to be understood in the broadest meaning of this term: accordingly the rod need not be solid but may also be in the form of a tube.

The required load bearing performance of a force transmission device is thus attained by a plural layer arrangement of the particulate material. The individual layers within the particulate filling material serve different objects. That layer which is composed of the relatively small individual bodies during the initial movement phase exercises in the force transmission device a pressure load onto the layer comprising the larger individual bodies. The pressure loading results in a manner apparent from FIG. 1 by the tightening of a screw closure and by the dragging effect of the ribbed rod onto the particulate filling material as it slides inside the device. The pressure loaded larger individual bodies are pressed into the material of the rod and/or of the bush and the rod and bring about the transmission of forces even if the rod moves long distances in the device.

BRIEF DESCRIPTION OF THE DRAWINGS

In the following the invention is described with reference to the drawing. There is shown in FIG. 1 a working example of the force transmission device according to the invention in axial section, and FIG. 2 a further working example of the device according to the invention similarly in axial section.

DETAILED DESCRIPTION

Figure 1:
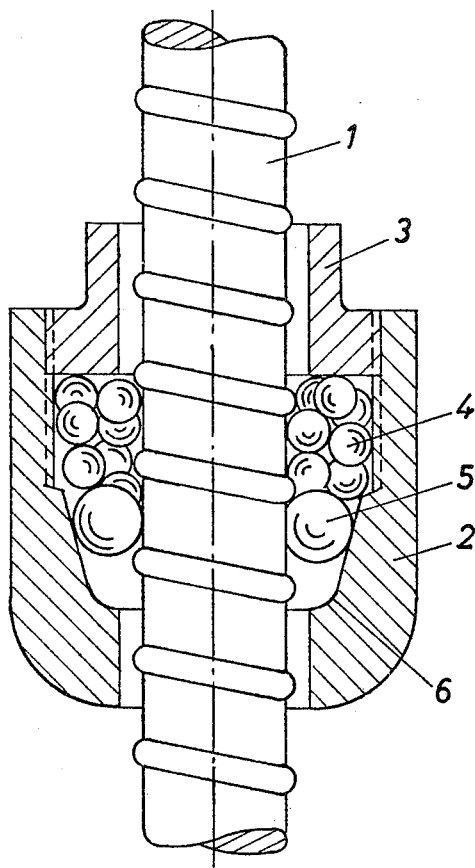

In FIG. 1 a ribbed rod is denoted as 1, being surrounded by a bush or sleeve 2. A screw closure 3 closes the interior of the bush 2 which in this example converges in the direction away from the screw closure 3 and terminates in a rounded region 6. The interior of the bush 2 is filled with particulate filling material. The particulate filling material preferably is composed of heaped comparatively small spheres 4 and of a layer of relatively larger spheres 5. The sphere material is for example steel. The sphere diameters are so selected that the individual larger spheres 5 when the spheres are forced into the converging intermediate space can get pressed into the material of the sleeve 2 as well as that of the rod 1, whilst the individual smaller sized spheres 4 which are to exercise compressive loads onto the larger spheres 5 are in contact either with the bush 2 only or with the rod 1 only.

The smaller spheres 4 which occupy the region towards the screw closure 3 have the advantage over the large spheres 5 that they bring about a more uniform introduction of compressive forces into the sphere aggregate when the screw closure 3 is tensioned. The tensioning itself moreover in the case of the smaller spheres 4 proceeds less irregularly. However, the spheres 4 must not be selected so small that they become jammed in the gap between the screw closure 3 and the rod or can escape through that gap. Moreover the size of the spheres 4 is to be particularly so selected that they can densely embrace the rod 1 so that the latter when being moved in the device exercises a maximum dragging effect and pressure loading onto the sphere aggegrate.

The larger spheres 5 when the rod 1 is moved in relation to the sleeve 2 predominantly bring about the deformations on the rod 1 and the sleeve 2. Once the larger spheres 5 have been pressed into the converging intermediate space between the sleeve 2 and the rod 1 so far that they have come to rest in the rounded region 6 of the intermediate space, they have attained their ultimate position in the sleeve 2 and form a kind of nozzle for the rod 1, the rod 1 is subjected to deformation by the spheres 5 which have entered into its periphery, resulting in the formation of longitudinal grooves in the rod surface. According to the invention the diameters of the larger bodies are at least 1½ times as large as the amount by which the ribs project from the rod, and the volumes of the individual larger bodies amount to at least one and a half times the volumes of the individual smaller bodies.

As is known for example from processes for the drawing of wires, the angle between the walls of the drawing nozzle and of the wire axis must be within a certain range so that the creeping deformations on the wire can take place. If the angle is too large, this results in brittle fractures in the wire. In analogy thereto suitable conditions for the deformations of the rod 1 must also be created in the case of the present force transmission device so that brittle cracking of the rod is avoided, whilst large displacement paths combined with high transmissions of forces are made possible in the device. For a given depth of penetration of the spheres 5 into the rod 1, the size of the spheres 5 determines the angle between the axis of the rod and the peripheries of the spheres along which the rod surface is deformed. In order to ensure an approximately uniform material deformation along the rod surface even in the case of large displacements and to prevent the spheres 5 from being pulled out of their embedment in the sleeve 2, it is necessary to employ appropriately large spheres 5. The layered arrangement of the sphere aggregate takes account of the fact that the suitable diameter for the spheres 5 along which the deformations of the rod take place is generally larger than the diameter of those spheres 4 which as described further above serve to increase the pressure loading onto the sphere aggregate. In the event that the layer of the larger spheres 5 is formed by a single layer of spheres as illustrated in FIG. 1, the material deformation of the rod takes place predominantly along this layer of spheres. This has advantages over a plural layer arrangement of larger spheres 5. In the plural layer arrangement the material deformations in the steel surface along the individual layers of spheres overlap. Such overlapping would result in deformation interference effects and in the material of the rod becoming brittle, thereby favouring fracture of the rod.

The mode of operation and the constructional design of the plural layer particulate filling material was explained using a steel sphere aggregate as an example. The individual bodies of the particulate filling material may, however, have shapes other than a spherical configuration and be composed of a hard and solid material other than steel. Thus the layer of the smaller individual bodies may be composed of a granulate so selected that it exercises a pressure load on the layer comprising the larger individual bodies by the described coacting with the remaining parts of the force transmission device. The form and the material of these larger individual bodies must be so selected that they can penetrate into the material of the rod 1 or of the rod 1 and the sleeve 2, that they become so embedded in the sleeve 2 that they cannot be pulled out therefrom and that the deformations along the steel surface permit high transmissions of forces in the case of long displacement paths within the force transmission device.

In order to facilitate the fitting onto anchor bolts of anchor heads, which for the purpose of transmitting forces contain particulate material, certain assembly aids have become known. Such assembly aids serve to ensure that the particulate filling material prior to and during the assembling does not drop out of the anchor head. For example there was thus proposed a stopper in the anchor head which retains the particulate filling material in the anchor head. When sliding the anchor head onto the anchor bolt, the stopper is pushed by the anchor bolt from the anchoring device. As a further assembly aid a hollow cylindrical body became known which encloses the particulate filling material in the anchor head. During the assembly procedure, this hollow cylindrical body enters into contact with the anchor rod and is then destroyed by the particulate filling material when put under load. It has also been proposed to bond together the particulate filling material by means of a solid-setting material sufficiently to prevent a dropping out of the particulate filling material during the assembly. When put under load, the bonding material is crushed and the particulate filling material once again reverts into its individual bodies.

By the aforesaid measures it is possible to ensure that the entire particulate filling material will remain inside the force transmission device. However, in order to provide for a specific load-bearing performance of the device, further constructional steps may be taken by which the conditions in the particulate filling material during the assembly and when under load can be influenced in a predeterminable manner. These further steps serve to inhibit undesirable restacking and repositioning within the particulate filling material or alternatively providing for the designed arrangement of the individual bodies within the particulate filling material to be brought about.

This, in accordance with the invention, may be attained by one or more insertions of solid, yet deformable material in the force transmission device and which fix all or a part of the individual bodies of the filling material individually or in groups. Rigidity of this holding material is necessary in order to provide the particulate filling material with an appropriate support; the deformability is necessary in order to provide the particulate filling material with that freedom of movement necessary for the assembly and the pressing in phenomena to which the particulate filling material is subjected. It is advantageous to employ for fixing the filling bodies a material having a high content of pores or hollow spaces, for example a foamed plastics. Such a material is highly compressible at the pressure spots and therefore does not interfere with the interaction of the particulate filling material and the remaining parts of the coupling device to any material extent.

Figure 2:
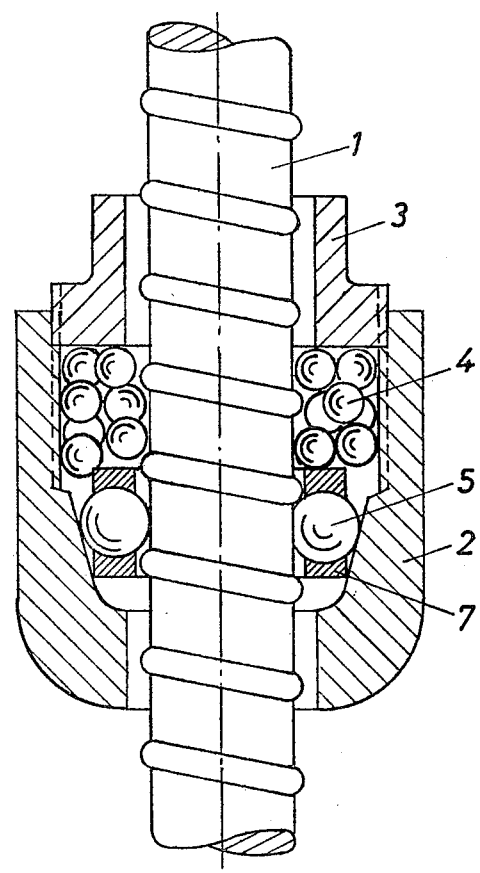

FIG. 2 illustrates by way of example such a locating means 7 in a force transmission device in which the screw closure 3 has not yet been tightened. The larger spheres 5 of a layered sphere aggregate comprising two sizes of spheres are inserted in the locating means 7, more particularly in accordance with the invention in such a manner as to form a ring.

The shape and the material of the locating means 7 may be adapted to the particular type of application and to a suitable manufacturing method. For example the locating means illustrated in FIG. 2, prior to its installation is a plane perforated strip into which the individual spheres 5 are inserted and which is then put in place into the annular space between the sleeve 5 and the rod 1. The invention may also provide that preferably the larger spheres are embedded in a resiliently and/or plastically deformable locating means.

In order to protect the force transmission device against infiltration of damaging substances, for example of water or mortar in the case of anchor bolts it is possible for the joints between the rod 1 and the ends of the sleeve 2 and the screw closure 3 to be sealed. In accordance with the invention, the seal is preferably provided at the converging end of the sleeve 2. Besides other possibilities of sealing it is even possible to employ the locating devices for the spheres for purposes of sealing the force transmission device. The locating means 7 illustrated in FIG. 2 besides locally fixing the larger spheres 5, also ensures that the smaller spheres 4 cannot drop through the gaps between the larger spheres and accordingly the structure of the layered sphere aggregate is maintained.

The separation of the individual layers within the particulate filling material one from another may in accordance with the invention also be attained by an insert between the larger and the smaller bodies of the filling material.

Also in accordance with the invention, an embedment of the particulate filling material in organic or synthetic greases which do not solidify within that temperature range in which the force transmission device according to the invention is to be used can be provided. This may be advantageous in several respects. The coherence of the particulate filling material brought about by this embedment in grease may facilitate the assembly of the force transmission device or may even make possible a proper assembly. Once the sleeve 2 which contains a particulate filling material 4 embedded in grease or grease-like material is pushed over the rod 1, the coherence of the particulate filling material, provided the consistency of the grease is properly selected, will prevent relayering or local compaction of the filling material by the action of gravity. The same effect might for example also be brought about as previously suggested by using a solid-setting material as the bedding material. Such a bedding material must however, in the force transmission procedure first be broken up again so that the particulate filling material is reduced into its individual parts. In the case of the force transmission devices illustrated in FIGS. 1 and 2, this could for example be brought about by the tightening of the screw closure 3. However, this presupposes applications of force which are dispensed with in the case when a non-hardening grease is used as the bedding material. The embedment of the particular filling material in a grease or a grease-like material brings about an at least temporary lubrication of those areas of contact of the particulate filling material with the sleeve 2 and the rod 1 along which the deformations of the rod and sleeve material take place. The lubrication of the areas of contact is also renewed at least in part even for major displacement paths of the rod 1 of the force transmission device since the rod 1 when sliding drags along the grease surrounding it. The lubrication lowers the peripheral forces at the areas of contact and reduces crack formations along the loaded surfaces or reduces the breaking tendency. The lubrication makes possible major material deformations in the force transmission device without the formation of fracture phenomena, or put in another way, it renders more uniform the procedure of material deformations and thus the progress of the transmission of forces in the device.

If grease is used as a bedding material for the particulate filling material, this will also provide protection against corrosion of the particulate filling material and also of the surfaces of the force transmission device with which it is in contact provided the grease itself or additives for the grease are suitably selected. Corrosion phenomena in the device which might modify the load bearing performance are thereby at least delayed. Such protection against corrosion is of substantial importance, for example in the context of tunnel roof bolts in damp country rock.

The same grease which is used as a bedding material for the particulate filling material may, if it is suitable therefor, at the same time serve for the lubrication and as protection against corrosion of threads of the force transmission device.

The force transmission device under discussion may also be subjected to the requirement that material displacements in the device will only arise as from a predetermined load onwards. Such a performance of the load of the force transmission device may in accordance with the invention be attained by a prestressing of the device prior to its actual use. A prestressing may be brought about for example in a completely assembled device as illustrated in FIGS. 1 and 2 by forcible sliding of the rod in such a manner that the particulate filling material is thereby pressed into the sleeve and/or the rod. Such a prestressing may be brought about even in the course of manufacture of the devices. Because of this prestressing substantial displacements within the devices during the actual use thereof will only come about after a limiting load has been exceeded, and during this relative movement the ability of the devices to transmit forces within a predetermined range is maintained.

An example for the application of the aforegoing are prestressed anchor bolts which by way of the force transmission device herein described bear against for example a country rock, the soil strata, a steel or a concrete construction etc. and in which substantial relative movements within the force transmission device will only take place when exceeding the predetermined tensioning force, but even then whilst maintaining the predetermined load-bearing ability. In the same manner even in the case of non-tensioned anchor bolts it may be required that the yieldability of the force transmission devices is to be as low as possible up to a predetermined loading. In the just mentioned examples the device provides an overload protection for the anchor rods proper and increases the deformation reserves of the entire anchor construction.

Analogously for example in tunnelling and mining under certain conditions and when using tubbings, their construction should be so designed that the tubbings mutually support each other by way of a pressure transmitting intermediate crushing layer which, however, must satisfy the requirement that it will begin to deform only as from a predetermined minimum pressure load onwards. This requirement can be met by the use of the prestressed force transmission devices according to the invention when used as crushing inserts.

In that case the transmission of forces, for example between two steel reinforced concrete tubbings takes place by way of the rods of the force transmission devices which are concrete embedded on one side in one of the tubbings and which on their part transmit the pressure by way of the sleeves onto the end faces of the other tubbing. In the event of a crushing taking place, the ends of the rods projecting from the sleeves and which are now free of tension, will slide into the corresponding apertures of these tubbings. Here as well, due to the prestressing of the force transmission devices the requirement is met that substantial relative movements will only arise as from a predetermined load.

The same requirements can for example also be met by yielding props in mining, in the use of pressure or traction bearing constructions as avalanche protective structures and in other constructions subjected to similar loads as protection against the effect of kinetic energies by their being equipped with force transmission devices in accordance with the invention.

It stands to reason that the invention is not restricted to the modes of application listed as examples, but may be employed wherever kinetic energy is to be converted at least in part into deformation work.

I claim:

1. Force transmission device of a type designed to resistively yield to mechanical overloads with a dissipation of energy by conversion thereof into deformation work, comprising:
   a bush having a converging interior;
   a closure for closing one end of the bush;
   a particulate filling material disposed in the bush; and
   a ribbed rod passing through the bush and the closure, the particulate filling material being present in at least two different sizes with the larger bodies of the filling material being substantially accommodated at the converging end of the interior of said bush and wherein the larger bodies have diameters that are at least one and a half times larger than the magnitude by which the ribs of the rod project.

2. Force transmission device according to claim 1, wherein individual larger bodies have volumes that are at least one and a half times as large as the volumes of the individual smaller bodies.

3. Force transmission device according to claim 1, wherein the larger bodies are arranged in an annular pattern, and whereby at least some of said larger bodies are arranged between the ribs and the bush.

4. Force transmission device according to claim 1, further comprising deformable locating means for holding at least some of the bodies.

5. Force transmission device according to claim 1, further comprising insert means for separating the larger bodies of the filling material from the smaller bodies.

6. Force transmission device according to claim 1, wherein the particulate material present in different sizes is provided in the form of larger and smaller spheres.

7. Force transmission device according to claim 1, which is prestressed for a predetermined overload before yielding commences.

8. Force transmission device according to claim 1, adapted as an anchor bolt.

9. Force transmission device according to claim 1, wherein the particulate material present in different sizes is provided in the form of granulate material.

10. A method of yieldingly supporting a load comprising:
    positioning particulate filling material having a first size in a lower portion of a bush having a downwardly converging interior;
    positioning particulate filling material having a size smaller than the first size in the bush above the first size particulate material;
    passing a ribbed rod through the bush to thereby form a device having an end portion of the rod protruding from an upper portion of the bush; and
    positioning the device so that the protruding portion of the rod supports the load whereupon an increase of the load results in movement of the rod and deformation of the rod by the first size particulate filling material.

* * * * *